April 5, 1927.
J. T. JENNINGS
CARBURETOR
Filed Dec. 4, 1922
1,623,683
2 Sheets-Sheet 1
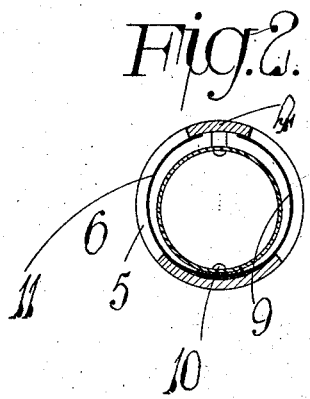
Fig. 2.
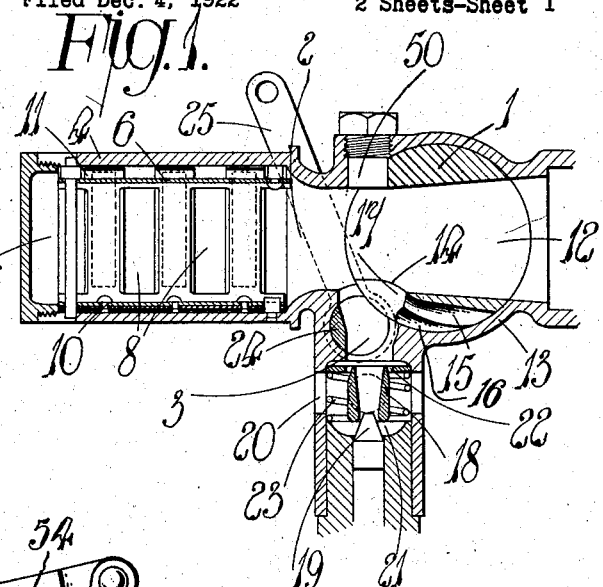
Fig. 1.
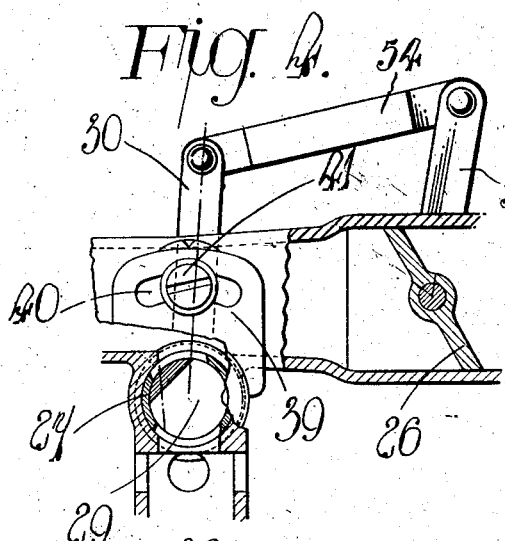
Fig. 4.
Fig. 3.
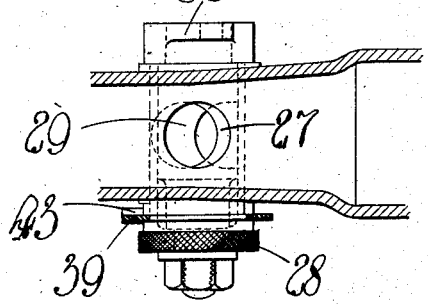
Fig. 5.
Inventor
John Thomas Jennings
By P. Hunzer
Atty.

April 5, 1927.
J. T. JENNINGS
CARBURETOR
Filed Dec. 4, 1922     2 Sheets-Sheet 2
1,623,683
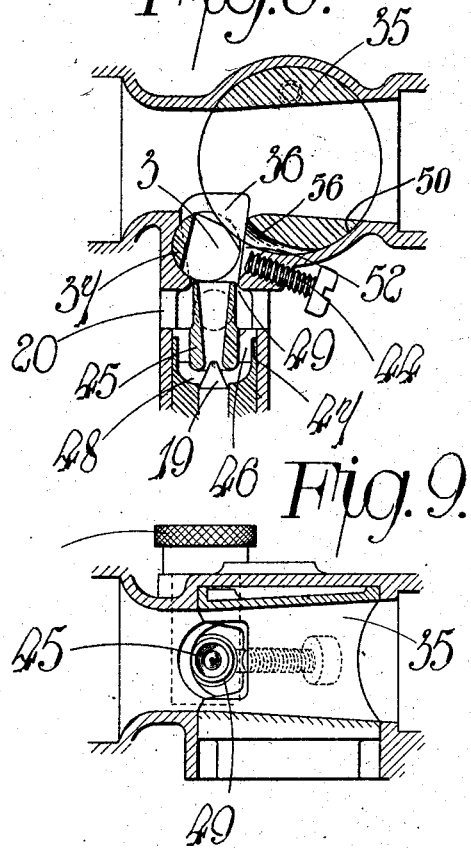
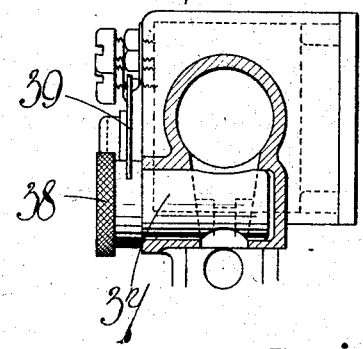
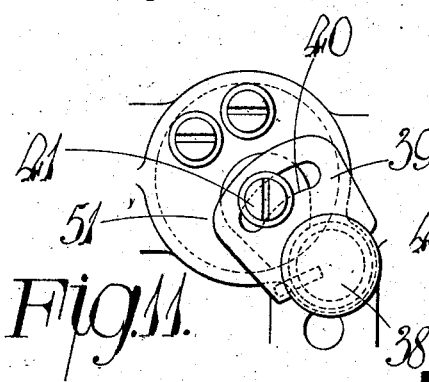
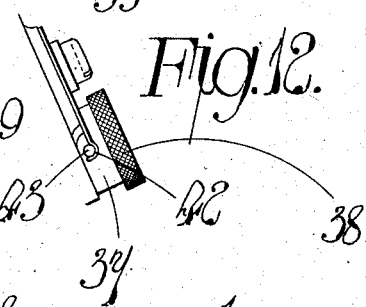
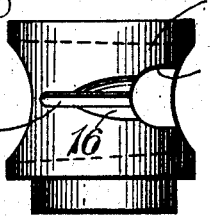

Patented Apr. 5, 1927.

1,623,683

UNITED STATES PATENT OFFICE.

JOHN T. JENNINGS, OF BIRMINGHAM, ENGLAND.

CARBURETOR.

Application filed December 4, 1922, Serial No. 604,903, and in Great Britain March 17, 1922.

This invention relates to carburetors and has for its main object to provide a carburetor which will operate automatically to adjust the strength of mixture provided to suit the needs of the engine.

Referring to the drawings:—

Figure 1 is a vertical section showing one method of carrying the invention into effect.

Figure 2 is a cross section taken through the air valve on line 2—2 in Figure 1.

Figure 3 is a horizontal section taken through the main throttle valve on line 3—3 in Figure 1.

Figure 4 is a vertical part section and part elevation showing another arrangement of main and primary throttles.

Figure 5 is a horizontal section on line 5—5 in Figure 4.

Figure 6 is a vertical section of another arrangement with the air valve omitted, and showing in full lines the throttle valve in its fully open position and in dotted lines the throttle valve in its nearly closed position.

Figure 7 is a sectional end view upon line 7—7 in Figure 6.

Figure 8 is a plan view of the Venturi tube shown in Figure 6.

Figure 9 is a horizontal section on line 9—9 in Figure 6.

Figure 10 is an external view of the underside of the main throttle valve shown in Figure 6.

Figure 11 is an external side view showing the means employed for locking the primary regulator.

Figure 12 is an end view of the apparatus shown in Figure 11.

Figure 13 is an external view of the underside of the main throttle valve shown in Figures 1 and 3.

Referring to the construction shown in Figures 1, 2 and 3, upon the inlet side of the main throttle valve 1 is provided a passage 2 for the main air supply and a passage 3 for the primary mixture of fuel and air.

The main air supply is preferably controlled by progressively loaded valves. In Figures 1 and 2 an improved arrangement of such progressively loaded valves is shown. This arrangement includes a tubular casing 4 having a number of circumferential slots 5. In the construction shown there are six slots 5 arranged in two groups of three. Within the tubular casing 4 and spaced apart therefrom, is an inner tube 6. This tube 6 is mounted eccentrically within the casing 4 and spaced apart therefrom but secured thereto by pins 7. This inner tube 6 is provided with openings 8 for the passage of the air admitted by the valves.

To the exterior of the tube 6 is secured the valve member 9. This valve member when assembled consists of a flexible piece of metal secured to the tube 6 by rivets 10 and having a number of fingers 11 which correspond to the ports 5. These fingers 11 by the resiliency of the metal, normally press against the interior of the tubular casing 4 and close the ports 5.

The fingers or valves 11 are so bent or curved when unrestrained, that when assembled in position and assuming that there is no suction within the carburetor, they close the ports 5. With increasing suction or depression in the carburetor the fingers 11 open progressively, the rate of opening being determined or arranged in accordance with the depression required for the purpose indicated. For instance, for producing a relatively slow increase in depression with increased flow, two or more of the fingers may open together. For a rapid increase in depression it would be arranged that not more than one valve opens with increasing suction.

To obtain the effects described, the valves are so loaded and the primary mixture port so proportioned that a relatively high depression exists in the carburetor when the engine is running light at very low speeds and this increases but slowly as the speed and power rises. The combination of high depression and closely throttled primary flow gives highly effective atomization.

The strength or stiffness of the fingers 11 are arranged either so that the ports 5 are all fully open at something less than maximum power, or they are arranged so that they do not all open until maximum power is reached.

The main throttle valve is in the form of a drum or plug 1 having a through passage or port 12 which is located along a diameter of the throttle and divides it into two operative or restricting members, disposed one above the other when the throttle is fully open. As the throttle is shut (by rotating it in a clockwise direction when viewed as in Figure 1), these members move into a more or less vertical position and restrict the flow of mixture to the engine. The throttle 1 is positioned so that it partially overlaps the outlet of the passage 3, and as it is progressively shut, the lower of these operative or restricting portions moves so as to progressively restrict the flow of primary mixture from the passage 3. The desired degree of progressive obstruction of the flow of mixture from the passage 3 is obtained by suitably dimensioning a port 14 formed in the periphery of the lower operative or restricting member of the throttle.

The shape of the port 14 can be seen from Figures 1, 3 and 13, the port comprising an elongated parallel slot 15 and a tapering portion 16 which leads to a wider opening 17. The shape of this port is designed to produce the effects upon the main mixture which have already been described. In designing this port the influence on the depression in the branch 2 caused by the movement of the main throttle 1, must be taken into account. It should be noted that the proportions of the port 14 are given as an example and are not necessarily correct. The parallel slot 15 allows the incoming jet of fuel to impinge directly on the end of a plug or stop 50 which enables access to be obtained, if necessary, to the branch passage 3, and which also serves as a stop for limiting the rotary movement of the throttle 1.

The primary mixture enters the branch 3 from a Venturi tube 18 into which discharges the nozzle 19. The fuel is fed to the nozzle 19 by any known method.

In order to assist an easy start and prevent waste of fuel, the supply of air that passes through the Venturi tube 18 is drawn into the carburetor through holes 20 which are at a higher level than the nozzle 19, so that it travels downwardly and passes into an annular recess 21 into which collects any overflow of fuel from the nozzle 19. This air is joined by another supply of air at the outlet of the Venturi tube 18 which issues as a stream surrounding the flow of air from the latter or from a series of holes 22 which are arranged around the discharge end of the Venturi tube. The Venturi tube may be supported in position by a spring 23.

Between the discharge end of the Venturi tube 18 and the main throttle is an adjustable valve or regulator 24 which takes the form of a recessed pin working in a cylindrical seat and capable of being set to suit the requirements of the engine by a lever 25 arranged at the exterior of the carburetor.

In the arrangement shown in Figures 4 and 5, instead of placing the main throttle so that it partially overlaps the end of the branch 3, it is spaced away therefrom.

A sleeve or regulator is shown for setting the maximum passage through the branch 3, which can be set by means of a knurled head 28 at the exterior of the casing. Within the sleeve or regulator 27 is provided a movable primary throttle 29 operated by a lever 30 which is connected by a link 54 to a lever 53 operating the main throttle 26. By this means the primary throttle 29 is caused to move with the main throttle to progressively restrict the discharge of primary mixture from the passage 3 as the main throttle is shut.

For locking the sleeve 27 in any desired position, I provide an adjustable plate 39 having a curved slot 40 which engages a binding screw 41. This plate 39 is arranged to engage with a projection 43 upon the sleeve 27. This device is similar to that described fully and illustrated with reference to Figures 6 to 13.

In the construction shown in Figures 6 to 12, the main throttle 35 is arranged partially to overlap the end of the branch 3 and as it opens to offer a decreasing obstruction to the passage of primary mixture into the carburetor, in a manner similar to that described with reference to Figures 1 and 3. The main throttle valve 35 is provided with a port 36 which has the same function as the port 14, but is of somewhat different shape as will be seen from Figure 9 and comprises a main opening 55 and a shallow extension or groove 56.

In this construction a regulator 37 is provided which can be set from the exterior of the carburetor by turning a knurled head 38. For locking the regulator in any desired position a movable plate 39 is provided having a curved slot 40 and a binding screw 41. The plate 39 is provided with a hooked end 42 engaging over a projection 43 upon the exterior of the external part of the regulator 37. The casing of the carburetor is provided with a facing 51 upon which the plate 39 is mounted. This facing 51 forms a positive stop for the pin or projection 43 when the regulator 37, or 27 is set to give the maximum opening for the primary mixture as would be required when starting.

For providing an increased throttle opening for the primary mixture when the main throttle is nearly closed, a slot 52 which is formed in the casing or body of the carburetor is shown in Figure 6. This passage can be obstructed to a greater or lesser extent, as desired, by the end of a screw 44. This slot 52 enables some primary mixture to flow past the trailing edge 50 of the main throttle valve when this valve is nearly closed, thereby providing for a richer main mixture when the engine is running very slowly.

In this construction a somewhat different form of Venturi tube is shown. In this case the Venturi tube 45 is provided with external ribs 46 which enable it to rest on a shoulder 47. As in the construction shown in Figure 1 the air enters the holes 20 above the level of the jet 19 and it passes down into a recess 48. In this case the discharge end of the Venturi tube 45 is surrounded by an annular port 49 through which air enters.

It will be understood that an air valve or valves are fitted, in the construction shown by Figures 4 to 12 which may operate upon a similar principal to that described with reference to Figures 1, 2 and 3.

Suitable stops may be provided for the main throttle, so that the operator will know when it is fully opened or fully closed.

Although the carburetor is described as giving a mixture which gradually increases in strength with increased load, it should be understood that the change may take place as a series of steps, without departing from the scope of the invention and with but a negligible or small effect on efficiency.

What I claim then is:—

A carburetor for supplying an explosive mixture which varies in quality as the speed of the engine changes and also as the throttle restriction is altered, comprising a mixing chamber, said chamber having an opening for the entrance of secondary air, a loaded valve controlling the entrance of secondary air through said opening, a branch passage opening into the mixing chamber for the admission of primary mixture, said branch passage having openings for the admission of fuel and primary air, and throttle means for restricting the outlet of the mixing chamber and also the branch passage at a point between its fuel inlet and said mixing chamber simultaneously by a single controlling operation, there being no restriction between the junction of said branch passage with the mixing chamber and the loaded valve, whereby the loaded valve responds consistently to changes of engine speed at all working throttle positions to provide additional air with an increase of engine speed, and an increase in the proportion of fuel in the mixture admitted is provided by the opening of the throtttle.

In witness whereof I affix my signature.

J. T. JENNINGS.